May 10, 1960
C. E. BILL ET AL
2,936,220
CENTRAL PROCESSED MATERIAL DISCHARGE ASSEMBLY
FOR ROTARY PROCESSING VESSELS
Filed Jan. 16, 1958
3 Sheets-Sheet 1
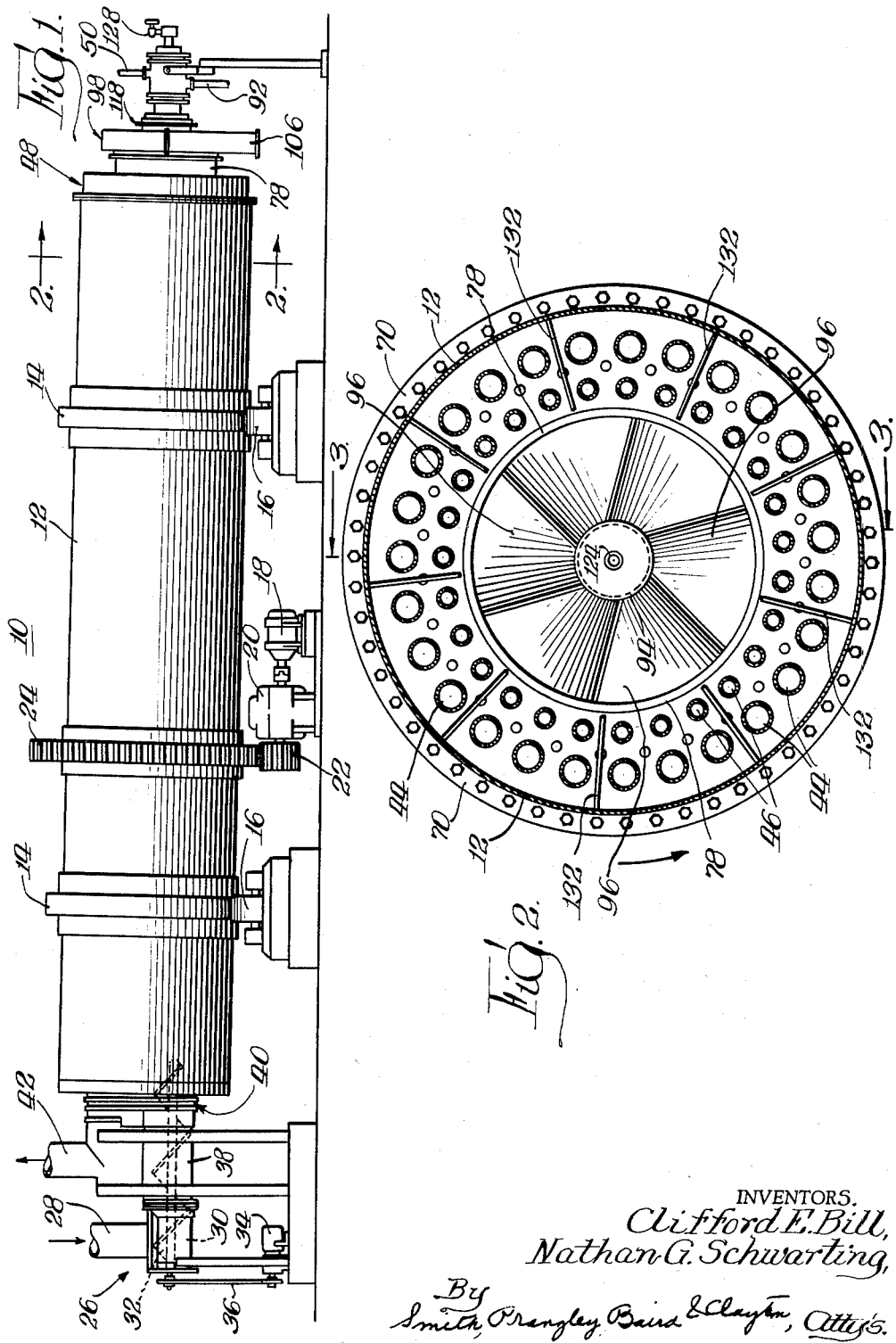
INVENTORS.
Clifford E. Bill,
Nathan G. Schwarting,
By Smith, Prangley, Baird & Clayton, Attys.

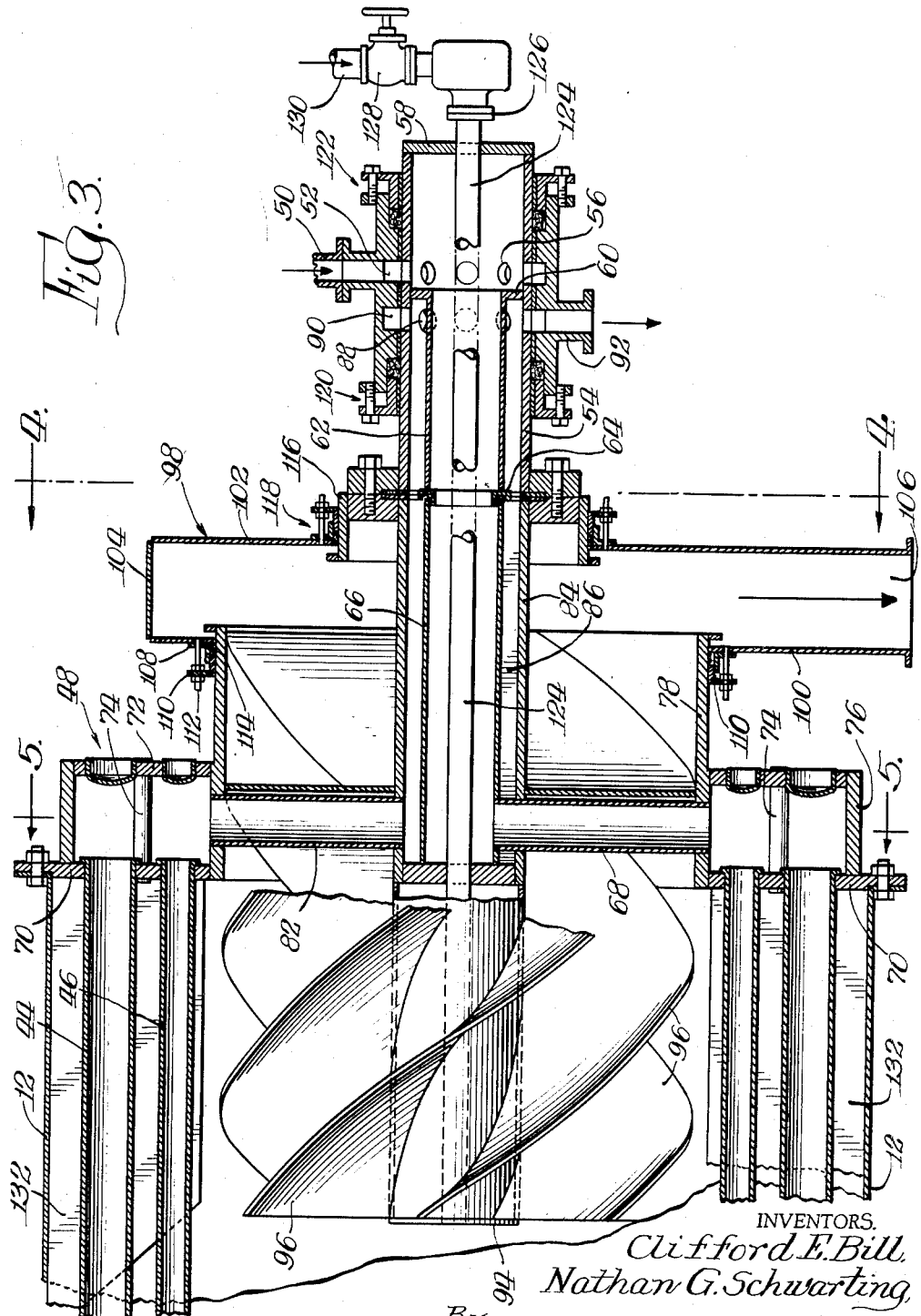

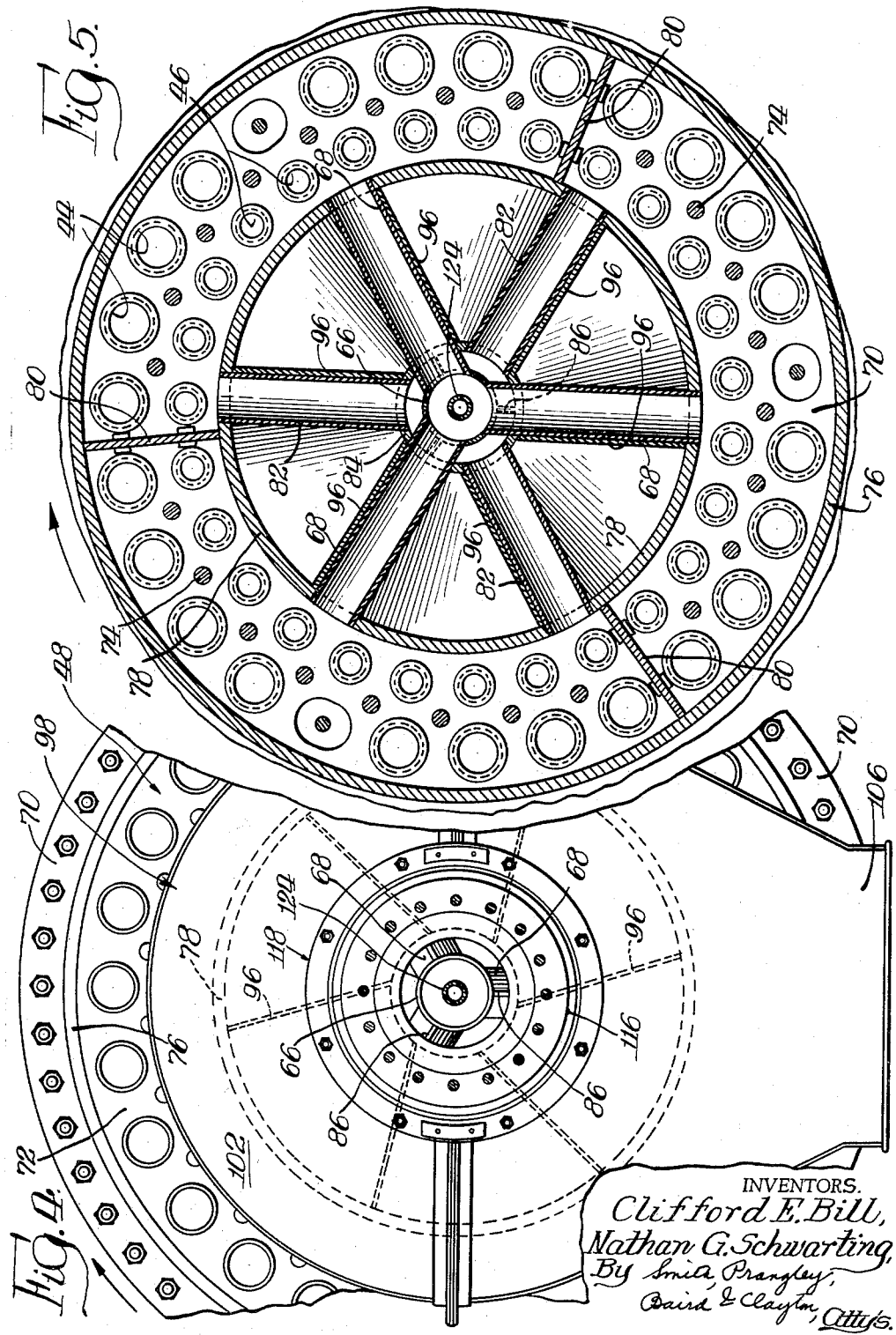

United States Patent Office 2,936,220
Patented May 10, 1960

2,936,220

CENTRAL PROCESSED MATERIAL DISCHARGE ASSEMBLY FOR ROTARY PROCESSING VESSELS

Clifford E. Bill, Louisville, Ky., and Nathan G. Schwarting, Syracuse, N.Y., assignors to General American Transportation Corporation, Chicago, Ill., a corporation of New York Application January 16, 1958, Serial No. 709,370

7 Claims. (Cl. 23—286)

This invention relates to improvements in rotary processing vessels and particularly to an improved processed material discharge therefor.

The vessel of the present invention may be a rotary drier, a rotary calciner, or other rotary reaction vessel. These vessels in general have material to be processed introduced therein at one end from a stationary supply and the processed material is removed from the other end of the vessel after treatment and/or reaction within the vessel to a stationary receptacle, all while the vessel is rotated. The vessel includes a heat exchange system whereby the material within the vessel may be heated or may be cooled as desired, whereby to carry out and control the processing of the material therein. In certain applications it is desirable that the atmosphere within the vessel be controlled. More specifically, it may be desirable to operate the vessel with the interior thereof at a pressure below the surrounding atmospheric pressure or it may be desirable to operate with a pressure within the vessel greater than the prevailing atmospheric pressure. Further, it may be desirable in certain cases to process the material under a predetermined atmosphere, other than air, such as carbon dioxide, nitrogen, hydrogen, inert gasses and the like. The various connections must all be made through hermetically sealed joints which permit introduction of the various agents in the vessel while continuously rotating the vessel; and because of the necessity for the gas-tight joints, it is difficult to arrange the continuous discharge of large amounts of processed material through such joints, while still maintaining efficient seals.

A specific example of a type of rotary processing vessel in which the present invention has particular utility is that utilized in the final step of the ammonia-soda process for preparing sodium carbonate or soda ash. In the final step of the process, a quantity of wet sodium bicarbonate is heated whereby to remove the water therefrom and further to convert the sodium bicarbonate to sodium carbonate, this latter reaction being accompanied by the evolution of water and carbon dioxide. It is desirable to reuse the carbon dioxide in the first steps of the ammonia-soda process. Accordingly, it is desirable to recover the carbon dioxide and to separate it from the water vapor and to prevent dilution thereof with unwanted material such as air. Therefore, the processing vessel is operated in a manner so as to exclude air therefrom and to provide for the collection and recovery of the carbon dioxide and the water vapor which are obtained from the reaction within the vessel, all the while permitting continuous rotation of the vessel and continuous introduction of material into the vessel and removal of material therefrom.

Accordingly, it is an important object of the present invention to provide an improved rotary reaction vessel of the type set forth, and more particularly to provide therein an improved discharge for processed material therefrom.

Another object of the invention is to provide a discharge assembly for use in reaction vessels of the type set forth which can discharge a large quantity of processed material from the rotating reaction vessel into a stationary delivery member while maintaining a hermetic seal therebetween.

Yet another object of the invention is to provide a material discharge assembly for processed materials in reaction vessels of the type set forth in which the size of the discharge assembly is reduced as compared with prior discharge assemblies.

In connection with the foregoing object it is another object of the invention to provide a discharge assembly of the type set forth in which the seal between the moving and non-moving parts is smaller than those used heretofore and is more efficient than those used heretofore.

Still another object of the invention is to provide an improved discharge assembly that is small in size, and that can remove processed material from the reaction vessel at a high rate.

Yet another object of the invention is to provide an improved discharge assembly for processed materials in a vessel of the type set forth wherein the discharge assembly is simpler and comprises fewer parts as compared with comparable assemblies utilized heretofore.

A further object of the invention is to provide an improved discharge assembly of the type set forth which operates successfully when the associated vessel is operated under pressures either above atmospheric pressure or below atmospheric pressure, the discharge assembly preventing leakage into or out of the associated vessel, whereby to conserve gasses introduced into or generated within the vessel and to prevent contamination of the gasses by outside air.

These and other objects and advantages of the invention will be better understood from the following description when taken in conjunction with the accompanying drawings. In the drawings wherein like reference numerals have been utilized to designate like parts throughout:

Figure 1 is a side elevational view of a cylindrical rotary drier incorporating a discharge assembly for processed material made in accordance with and embodying the principles of the present invention;

Figure 2 is an enlarged view in vertical section through the discharge end of the drier of Figure 1 and showing a portion of the improved discharge assembly substantially as seen in the direction of the arrows along the line 2—2 of Figure 1;

Figure 3 is a partial view in vertical section on a further enlarged scale through the discharge assembly of the drier of Figure 1 substantially as seen in the direction of the arrows along the line 3—3 of Figure 2, certain portions of the assembly being broken away for purposes of clarity;

Figure 4 is a view in vertical section through the discharge assembly of Figure 3 and showing particularly the material discharge substantially as seen in the direction of the arrows along the line 4—4 of Figure 3; and Figure 5 is a view in vertical section through the steam manifold and associated parts substantially as seen in the direction of the arrows along the line 5—5 of Figure 3.

The improved discharge assembly of the present invention has general utility when applied to processing vessels. The processing vessel incorporating the discharge assembly may be of the type wherein materials within the vessel are heated or alternatively the materials within the vessel may be cooled. On the other hand the vessel may be of the type wherein the materials therein in addition to being heated or cooled undergo a chemical reaction. The processing within the vessel may be carried out at atmospheric pressure or at a pressure below atmospheric pressure or at a pressure above atmospheric pressure. Likewise the atmosphere within the vessel may be air or may be water vapor, carbon dioxide, nitrogen, hydrogen, inert gasses and the like. The invention has particular utility when applied to a rotary drier for use in a final step of the ammonia-soda process wherein wet sodium bicarbonate is heated to remove the water therefrom and further to convert the sodium bicarbonate to sodium carbonate, this latter reaction being accompanied by the evolution of water and carbon dioxide. Accordingly, the invention will be specifically described as applied to such a reaction vessel but it is to be understood that other processing vessels of the type outlined above can also have the invention incorporated therein with advantage.

Referring now particularly to Figure 1 of the drawings there is shown a rotary drier generally designated by the numeral 10 which incorporates therein the improved processed material discharge of this invention. The drier 10 includes an elongated cylindrical vessel 12 which is suitably sealed at each end thereof to provide a hermetically sealed drier. Preferably the axis of the vessel 12 is disposed substantially horizontally and may be slightly inclined downwardly from the material charging end to the material discharging end, i.e., downwardly from the left toward the right, as viewed in Figure 1 of the drawings. The vessel 12 is supported in this position by a pair of tires 14 which are mounted thereon at spaced apart points and are each supported by trunnion rollers 16. Means is provided to rotate the vessel 12 about the axis thereof. More specifically, a prime mover such as an electric motor 18 is provided and is connected to a gear reducer 20 that drives a pinion 22. The pinion 22 engages and drives a large ring or gear 24 mounted on the vessel 12 between the tires 14. Operation of the motor 18 serves to drive vessel 12 in a clockwise direction as viewed from the discharge end thereof, i.e., the right hand end as viewed in Figure 1, while the vessel 12 is supported by the tires 14 upon the rollers 16.

Means is provided to introduce material to be processed into the vessel 12 in the form of a material inlet generally designated by the numeral 26. More specifically the material inlet 26 includes a vertically extending pipe 28 which deposits the material to be processed, for example wet sodium bicarbonate, in a hopper 30 from a source (not shown). Disposed within the hopper 30 is a screw conveyor 32 which is driven from a motor 34 through a belt 36. The conveyor 32 extends through a casing 38 and discharges into the left hand end of the vessel 12 as viewed in Figure 1. In order to maintain the hermetically sealed condition within the vessel 12, a hermetic seal 40 is provided between the rotating vessel 12 and the stationary casing 38.

The gases evolved during the processing of material within vessel 12 are collected and removed from the vessel 12 through a pipe 42. The pipe 42 enters and makes connection with the interior of the vessel 12 through the hermetic seal 40.

The interior of the vessel 12 is provided with a heat exchange system. More specifically a first group or row of pipes 44 is provided, the pipes 44 extending longitudinally of the vessel 12 with the pipes being arranged adjacent to the periphery thereof and spaced at equal distances therearound. An inner row of smaller pipes 46 is also provided, each smaller pipe 46 being in general radial alignment with one of the larger pipes 44. The ends of the pipes 44 and 46 disposed to the left as viewed in Figure 1 are received in a header and the right hand ends of the pipes are mounted in a manifold generally designated by the numeral 48 (see Figure 3 also). Intermediate the header and the manifold 48, the pipes 44 and 46 are suitably supported from the walls of the vessel 12.

Referring now more particularly to Figures 3 and 5 of the drawings, the construction and operation of the manifold 48 and the associated steam and condensate connections will be described. Steam for use in heating the pipes 44 and 46 is introduced through a pipe 50 from a suitable source (not shown), the lower end of the pipe 50 being in communication with an annular header 52. The header 52 is disposed about a tube 54 having a plurality of radially spaced openings 56 therein communicating with the annular channel in the header 52. The right hand end of the tube 54 is closed by a plate 58 and an annular ring 60 is provided to the left of the openings 56. A pipe 62 is connected to the ring 60 with the interior of the pipe 62 in communication with steam in the right hand end of the tube 54. The left hand end of the pipe 62 is in turn connected by a seal 64 with a second horizontally disposed pipe or tube 66. Attached to the pipe 66 and communicating with the interior thereof are three radially extending pipes or tubes 68 which are spaced equidistantly about the tube 66 and provide communication between the tube 66 and the manifold 48.

The manifold 48 includes a pair of annular plates 70 and 72 which are spaced apart and are preferably held in such spaced apart relation by a plurality of studs 74. A first cylindrical wall 76 closes the space between the outer edge of the plate 72 and the adjacent portion of the plate 70. The inner edges of the plates 70 and 72 are connected by a cylindrical member 78, the various parts being suitably interconnected as by welding. The outer ends of the pipes 68 are received through apertures in the cylindrical member 78 and are suitably secured thereto. The plate 70 receives the ends of the pipes 44 and 46 which are connected thereto and discharge into the manifold 48.

Referring more specifically to Figure 5 of the drawings, it will be seen that the interior of the manifold 48 is divided into three sections by radially extending walls 80. The radially extending pipes 68 are so positioned that one of the pipes 68 is connected substantially centrally of each of the three sections of the manifold 48. Accordingly, steam coming through the pipes 68 into the manifold 48 has access to the ends of the pipes 44 and 46 and can pass therethrough whereby to heat material within the vessel 12 as desired.

When heating by means of the steam within the pipes 44 and 46, the steam eventually condenses and the condensate is returned by gravity through the pipes 44 and 46 to the manifold 48 because of the downward inclination of the entire reactor 10 toward the manifold end of the vessel 12. As has been mentioned before, the vessel 12 is rotated in a clockwise direction as viewed from the right hand end thereof and clockwise as viewed in Figure 5. Accordingly, the condensate tends to pile up on the walls 80 which divide the manifold 48 into sections. Means is provided to drain the condensate outwardly from the manifold 48 and to a discharge point outside of the vessel 12. To this end three equispaced and radially extending pipes 82 are provided making connection with the manifold adjacent to each of the three walls 80. The pipes 82 extend radially inwardly and connect with a tube 84 which is disposed about the tube 66 and forms a continuation of the tube 54 described above, the tubes 54 and 84 being hermetically interconnected by the seal 64. By this arrangement the condensate passes radially inwardly from the collection thereof on the walls 80 and along the associated pipe 82 and downwardly into the annular space between the pipes 66 and 84. More specifically as a wall 80 is rotated upwardly to the horizontal position, the condensate collected thereagainst will tend to flow into the associated pipe 82 and as the pipe 82 continues upwardly the condensate will be directed downwardly into the annular space between the pipes 66 and 84. In order to prevent the condensate from draining directly from one pipe 82 into the other, radially extending plates 86 are disposed equidistantly between the pipes 82, the plates 86 extending across the annular space between the pipes 66 and 84 and longitudinally thereof on either side of the pipes 68.

The collected condensate travels downwardly in the annular space between the pipes 66 and 84 to the right as viewed in Figure 3 and out through a plurality of radially disposed apertures 88 provided in the pipe 54. The condensate is collected in an annular channel 90 and falls downwardly through a condensate outlet 92. Preferably the outlet 92 is connected to a steam trap (not shown) to preserve the steam pressure within the tubes 44 and 46.

In the specific example of the invention set forth wherein the reaction vessel 12 is utilized in the ammonia-soda process to convert wet sodium bicarbonate into dry sodium carbonate, the wet sodium bicarbonate is introduced into the reaction vessel 12 through the pipe 28 (see Figure 1). The wet sodium bicarbonate is heated by the steam passing through the pipes 44 and 46 whereby to change the water associated therewith to water vapor and to cause the sodium bicarbonate to break down to form sodium bicarbonate, water and carbon dioxide. The vaporized water and the carbon dioxide are withdrawn through the pipe 42. As the sodium bicarbonate and the sodium bicarbonate mixture passes from the left to the right as viewed in Figure 1 through the vessel 12, it is gradually all converted to dry sodium carbonate. The steam pipes 44 and 46 serve to break up and to feed the material within the vessel 12 to the right or toward the discharge end thereof.

It is desired to remove the dry material from within the vessel 12 rapidly and efficiently without the loss of any of the carbon dioxide within the vessel 12 and without any introduction of air thereinto. The carbon dioxide can be readily separated from the water vapor by cooling and condensing the water vapor, and the carbon dioxide is then recycled as one of the important starting materials in a prior step of the ammonia-soda process. Loss of the carbon dioxide or admission of air thereto would be a substantial economic loss in the overall process.

Accordingly, the improved process material discharge assembly of the present invention has been provided. Referring specifically to Figure 3 of the drawings it will be seen that the pipe 84 has attached thereto a rearwardly extending section of pipes 94 having substantially the same external diameter as the pipe 84 and extending a substantial distance into the vessel 12. Mounted on the pipe 94 is a plurality of plates 96 which may be of a spiral or helical form. Preferably six identical plates 96 are provided equally spaced about the periphery of the pipe 94, one plate 96 being provided for each of the pipes 68 and 82. If a different number of pipes 68 and 82 are used, then a corresponding number of plates 96 are used. The plates 96 are further arranged so that they pass the pipes 68 and 82 so that they are disposed against and secured to the forward edges thereof (see particularly Figure 5) so as to carry material therepast and to prevent the clogging of material on the side of the pipes 68 and 82 disposed toward the interior of the vessel 12. Each of the plates 96 extends into the vessel 12 along the pipe 94 and is connected to the pipe 94 on the inner edge of the plate and each of the plates is further connected on the outer edge thereof to the cylindrical member 78.

The right hand ends of the cylindrical member 78 and the plates 96 terminate in the same plane and in a discharge hood generally designated by the numeral 98. The discharge hood 98 includes a rear wall 100 having a circular opening therein to receive the cylindrical member 78 therethrough. Spaced from the rear wall 100 and disposed substantially parallel thereto is a front wall 102. A side wall 104 extends between the walls 100 and 102, a space being left at the bottom thereof to provide a discharge connection 106.

The discharge hood 98 is stationary whereas the vessel 12 and the cylindrical member 78 adjacent to the discharge hood 98 are rotated. It is desired to maintain a hermetic seal between the cylindrical member 78 and the discharge hood 98. To this end a flange 108 is mounted on the rear wall 100 and includes an annular portion surrounding the cylindrical member 78 and spaced therefrom. A second annular flange 110 is provided around but not connected to the cylindrical member 78 opposite the flange 108 and a plurality of adjustable bolts 112 interconnect the flanges 108 and 110. A suitable packing material 114 is provided between the flange 110 and the rear wall 100 whereby to provide an air tight or hermetic seal between the cylindrical member 78 and the discharge hood 98.

The pipe 84 which passes through the front wall 102 of the hood 98 also rotates and, accordingly, it is desirable to provide a hermetic seal therebetween. To this end an annular ring 116 is suitably mounted on the pipe 84 and extends inwardly through a circular aperture in the front wall 102. A seal 118 substantially identical with the seal 108 described above is provided between the front wall 102 and the annular ring 116. The material being discharged may pass through a vacuum valve or star valve (not shown) and attached to the discharge connection 106 whereby to maintain the desired pressure and gaseous atmosphere within the vessel 12.

It is also necessary to provide hermetic seals between the steam inlet and the condensate outlet and the rotating pipe 54. To this end two packing gland seals 120 and 122 have been provided (see Figure 3).

In certain instances it is desirable to introduce various gases into the interior of the vessel 12; and to this end an exterior fitting has been provided. Referring to Figure 3, it will be seen that a pipe 124 extends through the plate 58 and within the pipes 62 and 66 and through the pipe 94. The left-hand end of the pipe 124, as viewed in Figure 3, is in communication with the interior of the vessel 12. The right-hand end of the pipe 124 is connected by means of a rotary union 126 to a valve 128 which is in turn connected through a pipe 130 to a suitable source of the required gas (not shown).

When utilizing the vessel 12 in the ammonia-soda process, as described above, it may be desirable initially to flush or purge air therefrom employing carbon dioxide, the carbon dioxide serving to sweep any air, water, vapor, etc. toward the outlet pipe 42.

As has been explained above the dried sodium carbonate or other processed material gradually is driven to the right hand end of the vessel 12 as viewed in Figure 1 whereby to come in contact with the discharge assembly and more specifically the plates 96 thereof. The pipes 44 and 46 in general feed the dried material inwardly toward the center of the vessel 12 and into contact with the plates 96. In order to aid this movement of the material, a plurality of radial plates or lifters 132 has been provided within the vessel 12 and among the steam pipes 44 and 46. Referring to Figure 2 it will be seen that nine of the plates 132 have been provided. In general the radial plates 132 extend from the wall 70 to the left to a point beyond the inner end of the plates 96 (see Figure 3). Rotation of the vessel 12 therefore will drive the screw blades 96 therewith and the radial plates 132 will aid in urging the material into contact therewith. The six plates 96 will positively feed the processed material past the radially extending pipes 68 and 82 and will prevent any build up or clogging of material thereon. After feeding the material past the pipes 68 and 82, the blades 96 will deposit the material in the discharge hood 98. The material falls downwardly therethrough and out through the bottom connection 106 thereof.

The above described feed of the processed material is positive and will move a large quantity of material into the discharge hood 98. More specifically the helical plates 96 will move the processed material past the pipes 68 and 82 without permitting a pile up of material therebehind. To this end the plates 96 are arranged on the sides of the pipes disposed in the direction of rotation thereof. This movement of the processed material is obtained while maintaining the hermetically sealed condition of the reaction vessel 12. The lifters 132 aid in feed of the process material by directing the material radially inwardly from the outer periphery of the vessel 12 past the heat exchange pipes 44 and 46 and onto the helical plates 96.

The arrangement of the discharge assemblies provides sealing areas which are small as compared with those used heretofore and it has been found that the sealing is more efficient than in the case of the larger assemblies utilized heretofore. The discharge assembly is simple and comprises a few parts yet is efficient in removing processed material rapidly in large quantities from the interior of the vessel 12 into the discharge hood 98.

It will be seen that there has been provided a rotary processing vessel made in accordance with the present invention and including therein an improved process material discharge assembly which fulfills all of the objects and advantages set forth above. Although one preferred embodiment of the invention has been shown and described for purposes of illustration, it is to be understood that various changes and modifications can be made therein without departing from the spirit and scope of the invention. Accordingly, the invention is to be limited only as set forth in the following claims.

What is claimed is:

1. In combination with an elongated hermetically sealed processing vessel mounted for rotation about the longitudinal axis thereof and having a heat exchange conduit therein and provided with an end wall at the discharge end thereof having a centrally disposed discharge opening therein; a fluid joint and processed material discharge assembly disposed at the discharge end of said vessel and comprising a cylindrical member secured at the inner end thereof to said end wall for rotation therewith, the inner end of said cylindrical member being hermetically sealed to said end wall and communicating with said discharge opening therein, a tube disposed within said cylindrical member and secured thereto for rotation therewith, said tube being spaced radially inwardly from said cylindrical member and arranged substantially concentric therewith to define an annular space therebetween, a manifold mounted on the discharge end of said vessel and communicating between said conduit and the inner end of said tube so as to accommodate the supply of heat exchange fluid from said tube into said conduit, said cylindrical member and said tube extending outwardly from said end wall and the axes thereof substantially coinciding with the axis of rotation of said vessel, a stationary discharge hood mounted adjacent to the discharge end of said vessel and having a first opening in the adjacent first side thereof to receive said cylindrical member and an aligned second opening in the remote second side thereof to receive said tube, a first hermetic seal between said cylindrical member and said first side of said discharge hood and a second hermetic seal between said tube and said second side of said discharge hood, said seals accommodating rotation of said cylindrical member and said tube relative to said discharge hood, and a spiral conveyor arranged in the annular space between said cylindrical member and said tube and extending radially therebetween and secured thereto for rotation therewith, the inner end of said conveyor projecting into the adjacent discharge end of said vessel and the outer end thereof terminating adjacent to said discharge hood so as to move processed material from the discharge end of said vessel through the annular space between said cylindrical member and said tube into said discharge hood incident to rotation of said vessel.

2. The combination as set forth in claim 1, and further comprising a second conduit projecting from the exterior through said tube into the discharge end of said vessel and accommodating the introduction of a treating gas into said vessel, said second conduit being hermetically sealed to said tube and rotatable therewith, and valve means for controlling the supply of treating gas under pressure into said second conduit.

3. The combination as set forth in claim 1, and further comprising lifters mounted on the interior of said vessel for rotation therewith and positioned to direct processed material onto said spiral conveyor past said heat exchange conduit.

4. The combination as set forth in claim 1, and further comprising a plurality of lifters mounted on the interior of said vessel and positioned to direct processed material past said heat exchange conduit and onto the portion of said conveyor flights disposed within said vessel, said lifters having a longitudinal extent such that they extend from the discharge end of said vessel to a point opposite the inner end of said spiral conveyor and extend radially inwardly to a point spaced from said spiral conveyor.

5. In combination with an elongated hermetically sealed processing vessel mounted for rotation about the longitudinal axis thereof and having a heat exchange conduit therein and provided with an end wall at the discharge end thereof having a centrally disposed discharge opening therein; a fluid joint and processed material discharge assembly disposed at the discharge end of said vessel and comprising a cylindrical member secured at the inner end thereof to said end wall for rotation therewith, the inner end of said cylindrical member being hermetically sealed to said end wall and communicating with said discharge opening therein, a tube disposed within said cylindrical member and secured thereto for rotation therewith, said tube being spaced radially inwardly from said cylindrical member and arranged substantially concentric therewith to define an annular space therebetween, a manifold mounted on the discharge end of said vessel and communicating with said conduit, a plural number $n$ of pipes disposed in said annular space and extending between said manifold and the inner end of said tube so as to accommodate the supply of heat exchange fluid from said tube through said manifold into said conduit, said cylindrical member and said tube extending outwardly from said end wall and the axes thereof substantially coinciding with the axis of rotation of said vessel, a stationary discharge hood mounted adjacent to the discharge end of said vessel and having a first opening in the adjacent first side thereof to receive said cylindrical member and an aligned second opening in the remote second side thereof to receive said tube, a first hermetic seal between said cylindrical member and said first side of said discharge hood and a second hermetic seal between said tube and said second side of said discharge hood, said seals accommodating rotation of said cylindrical member and said tube relative to said discharge hood, and a spiral conveyor arranged in the annular space between said cylindrical member and said tube and including said $n$ number of spiral plates disposed between said pipes and extending radially between said cylindrical member and said tube and secured thereto for rotation therewith, the inner end of said plates projecting into the adjacent discharge end of said vessel and the outer end thereof terminating adjacent to said discharge hood so as to move processed material from the discharge end of said vessel through the annular space between said cylindrical member and said tube past said pipes and into said discharge hood incident to rotation of said vessel.

6. In combination with an elongated hermetically sealed processing vessel mounted for rotation about the longitudinal axis thereof and having a heat exchange conduit therein and provided with an end wall at the discharge end thereof having a centrally disposed discharge opening therein; a fluid joint and processed material discharge assembly disposed at the discharge end of said vessel and comprising a cylindrical member secured at the inner end thereof to said end wall for rotation therewith, the inner end of said cylindrical member being hermetically sealed to said end wall and communicating with said discharge opening therein, a tube disposed within said cylindrical member and secured thereto for rotation therewith, said tube being spaced radially inwardly from said cylindrical member and arranged substantially concentric therewith to define an annular space therebetween, a manifold mounted on the discharge end of said vessel and communicating with said conduit, a plural number $n$ of pipes disposed in said annular space and equally spaced circumferentially and extending between said manifold and the inner end of said tube so as to accommodate the supply of heat exchange fluid from said tube through said manifold into said conduit, said cylindrical member and said tube extending outwardly from said end wall and the axes thereof substantially coinciding with the axis of rotation of said vessel, a stationary discharge hood mounted adjacent to the discharge end of said vessel and having a first opening in the adjacent first side thereof to receive said cylindrical member and an aligned second opening in the remote second side thereof to receive said tube, a first hermetic seal between said cylindrical member and said first side of said discharge hood and a second hermetic seal between said tube and said second side of said discharge hood, said seals accommodating rotation of said cylindrical member and said tube relative to said discharge hood, and a spiral conveyor arranged in the annular space between said cylindrical member and said tube and including said $n$ number of spiral plates disposed between said pipes, each of said plates being arranged adjacent to one of said pipes on the side thereof disposed in the direction of rotation thereof and extending radially between said cylindrical member and said tube and secured thereto for rotation therewith, the inner ends of said plates projecting into the adjacent discharge end of said vessel and the outer ends thereof terminating adjacent to said discharge hood so as to move processed material from the discharge end of said vessel through the annular space between said cylindrical member and said tube past said pipes and into said discharge hood incident to rotation of said vessel.

7. In combination with an elongated hermetically sealed processing vessel mounted for rotation about the longitudinal axis thereof and having a heat exchange conduit therein and provided with an end wall at the discharge end thereof having a centrally disposed discharge opening therein; a fluid joint and processed material discharge assembly disposed at the discharge end of said vessel and comprising a cylindrical member secured at the inner end thereof to said end wall for rotation therewith, the inner end of said cylindrical member being hermetically sealed to said end wall and communicating with said discharge opening therein, a tube disposed within said cylindrical member and secured thereto for rotation therewith, said tube being spaced radially inwardly from said cylindrical member and arranged substantially concentric therewith to define an annular space therebetween, a manifold mounted on the discharge end of said vessel and communicating with said conduit, a plural number $n$ of pipes disposed in said annular space and equally spaced circumferentially and extending between said manifold and the inner end of said tube so as to accommodate the supply of heat exchange fluid from said tube through said manifold into said conduit, said cylindrical member and said tube extending outwardly from said end wall and the axes thereof substantially coinciding with the axis of rotation of said vessel, a stationary discharge hood mounted adjacent to the discharge end of said vessel and having a first opening in the adjacent first side thereof to receive said cylindrical member and an aligned second opening in the remote second side thereof to receive said tube, a first hermetic seal between said cylindrical member and said first side of said discharge hood and a second hermetic seal between said tube and said second side of said discharge hood, said seals accommodating rotation of said cylindrical member and said tube relative to said discharge hood, an extension mounted on said tube concentric therewith and extending into the interior of said vessel, and a spiral conveyor arranged in the annular space between said cylindrical member and said tube and including said $n$ number of spiral plates disposed between said pipes, each of said plates being arranged adjacent to one of said pipes on the side thereof disposed in the direction of rotation thereof and extending radially between said cylindrical member and said tube and secured thereto for rotation therewith, said plates extending longitudinally from the inner end of said extension within said vessel to a point adjacent to said discharge hood so as to move processed material from the discharge end of said vessel through the annular space between said cylindrical member and said tube past said pipes and into said discharge hood incident to rotation of said vessel.

References Cited in the file of this patent

UNITED STATES PATENTS

| 1,052,660 | Geiger | Feb. 11, 1913 |
| 1,139,663 | Geiger | May 18, 1915 |
| 2,848,198 | Bill | Aug. 19, 1958 |

FOREIGN PATENTS

| 665,325 | France | May 6, 1929 |